United States Patent

Marion et al.

[11] 3,709,669
[45] Jan. 9, 1973

[54] METHANE PRODUCTION

[75] Inventors: Charles P. Marion, Mamaroneck, N.Y.; Warren G. Schlinger, Pasadena; William L. Slater, La Habra, both of Calif.

[73] Assignee: Texaco Inc., New York, N.Y.

[22] Filed: Dec. 28, 1970

[21] Appl. No.: 101,724

[52] U.S. Cl. ...................... 48/215, 48/214, 252/373, 260/449 M
[51] Int. Cl. ................................................. C01b 2/14
[58] Field of Search........ 48/215, 197, 214, 213, 212, 48/210; 260/449 M; 252/459, 373

[56] References Cited

UNITED STATES PATENTS

| | | | |
|---|---|---|---|
| 2,840,462 | 6/1958 | Gorin | 48/197 R |
| 3,194,644 | 7/1965 | Gorin et al. | 48/197 R |
| 3,222,147 | 12/1965 | Benson | 48/197 R |
| 3,503,724 | 3/1970 | Benson | 48/215 X |
| 3,531,267 | 9/1970 | Gould | 48/213 |

*Primary Examiner*—Morris O. Wolk
*Assistant Examiner*—R. E. Serwin
*Attorney*—Thomas H. Whaley and Carl G. Ries

[57] ABSTRACT

Process for the production of a methane-rich gas stream from a hydrocarbonaceous feedstock with all steps being carried out at or slightly above the desired pressure of delivery. Effluent gas from a free-flow partial-oxidation synthesis-gas generator, and preferably containing from about 10–26 volume percent methane on a dry basis is reacted with steam and without a catalyst at a temperature in the range of 2,800 to 1,500°F. to produce a stream of shifted gases having a mole ratio $H_2/CO$ in the range of 1.5 to 4 and preferably about 3. The shifted gases are then processed by the steps of scrubbing with a liquid hydrocarbon to recover particulate carbon, cooling to condense out water and volatile hydrocarbons, purifying by eliminating $H_2S$ and $CO_2$ in a separation zone, and catalytically reacting the remaining $H_2$ and CO in the process gas stream to produce a process gas stream comprising at least 45 volume percent methane on a dry basis.

12 Claims, 1 Drawing Figure

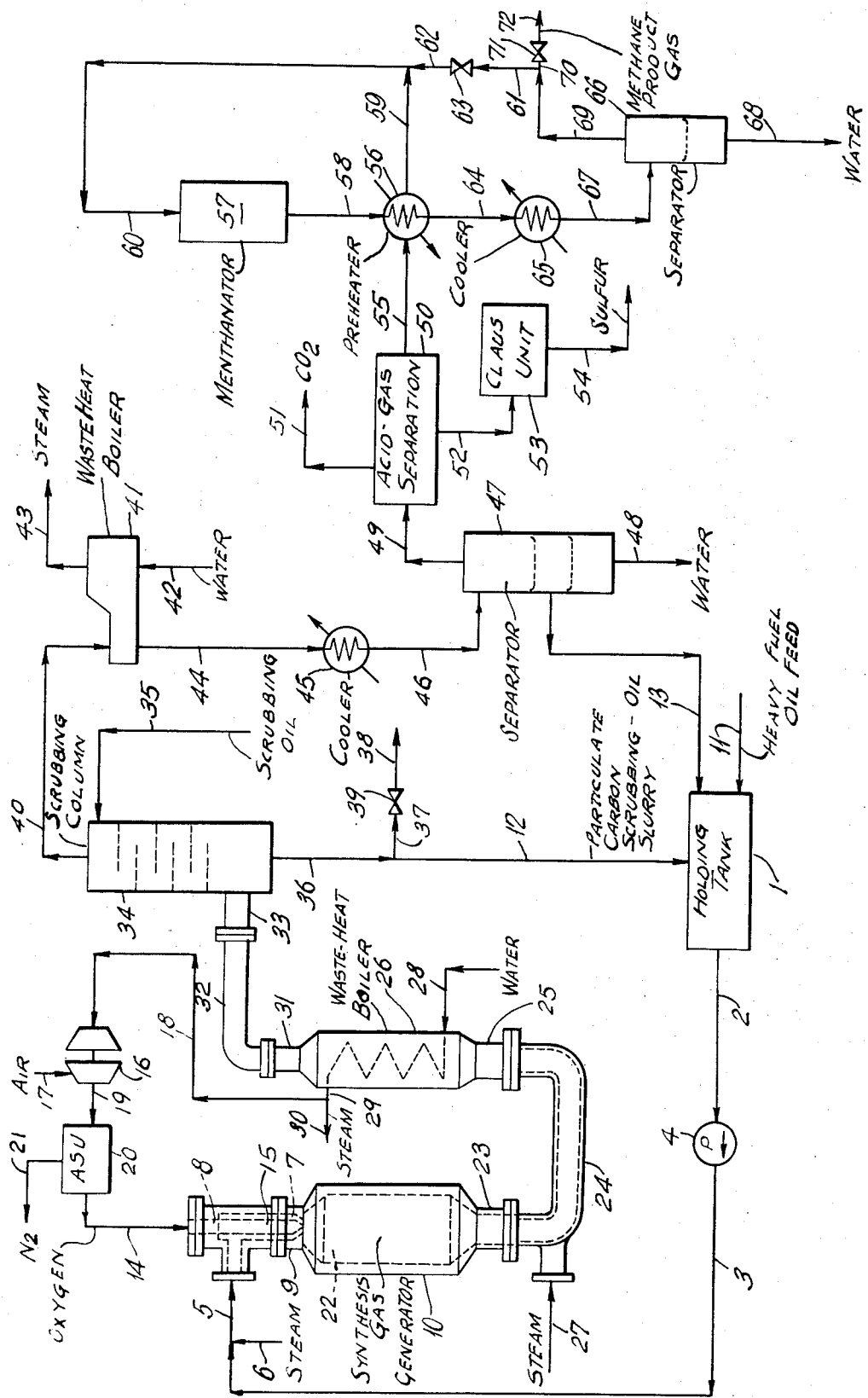

METHANE PRODUCTION

BACKGROUND OF THE INVENTION

1. Field of the Invention

This invention relates to a continuous process for the production of a gas stream containing methane in the amount of about 45 to 99 volume percent on a dry basis.

2. Description of the Prior Art

While methane in high concentrations may be found in natural gas and coke oven gas, these gases are often in short supply.

Methanation reactions have been used for purifying hydrogen by consuming undesired oxides of carbon. For example, the catalytic hydrogenation of carbon monoxide and carbon dioxide to methane has been used to eliminate small quantities of these compounds remaining in gas streams after bulk removal of the carbon dioxide by other techniques. Such processes are economic for the treatment of gas streams containing the oxides of carbon at a maximum concentration of about 2 mole percent or less.

SUMMARY

This is a continuous process for the production of a methane-rich gas stream, i.e. containing about 45–99.0 volume percent $CH_4$ (dry basis). Raw synthesis gas principally comprising $H_2$, $CO$, $CO_2$, $H_2O$, and $CH_4$, and containing small amounts of $N_2$, A, COS, $H_2S$ as well as some particulate carbon is produced by the partial oxidation of a hydrocarbon-aceous feedstock in the presence of steam in the reaction zone of a free-flow unpacked compact synthesis-gas generator at an autogenous temperature in the range of 1,200 to 3,000°F. and a pressure in the range of about 1 to 250 atmospheres. Preferably, the weight ratio of $H_2O$ to hydrocarbonaceous feedstock is in the range of about 3 to 5, the atomic ratio (O/C) is in the range of about 0.60 to 1.2, and the autogenous reaction temperature of the effluent gas is in the range of about 1,200 to 2,200°F. and especially under 1,700°F. for maximum methane yields. Unexpectedly and unobviously under such conditions the content of methane in the effluent gas from the gas generator is unusually high, i.e., about 10 to 26 volume percent (dry basis) or higher. The hot effluent gas from the reaction zone of the synthesis gas generator is then mixed in a free flow noncatalytic shift converter with supplemental steam which is produced subsequently in the process. Then at an elevated temperature in the range of about 2,800 to 1,500°F. and preferably in the range of about 2,800 to 1,700°F. CO in the effluent gas is noncatalytically reacted with supplemental $H_2O$ to produce additional $H_2$ and $CO_2$. This thermal-shift reaction is continued until the hydrogen and carbon monoxide in the process gas stream are in the mole ratio $H_2/CO$ in the range of 1.5 to 4, and preferably about 3.

The shifted gas is cooled in a waste-heat boiler to a temperature above the dewpoint of $H_2O$ in the gas but below the cracking temperature of the scrubbing oil e.g. less than about 800°F. The cooled gas is then scrubbed with a liquid hydrocarbon oil (for example, the feedstock to the process) in a gas-liquid scrubbing zone. By this means the process gas is cooled to a temperature above the dewpoint and the scrubbing oil is heated. The preheated slurry of particulate carbon and scrubbing oil from the bottom of the scrubbing zone is preferably pumped to the synthesis-gas generator as the major portion of the feed. Optionally, a portion of the slurry may be used elsewhere in the system as a fuel.

The scrubbed gas is then cooled to condense out any water and volatile hydrocarbons. $CO_2$ and $H_2S$ are then removed from the process-gas stream by means of an acid-gas separation unit. The remaining mixture of hydrogen and carbon monoxide is catalytically reacted at a temperature in the range of about 390 to 1,000°F. and at a pressure in the range of about 1 to 250 atmospheres to produce a gaseous stream comprising at least 45 volume percent of methane (dry basis). Carbon dioxide produced in methanation may be removed from the process gas stream by conventional means leaving a substantially $CO_2$-free methane stream. The highly exothermic methanation reaction may be controlled by cooling the reaction zone by indirect heat exchange with water and converting the water to steam. This steam is advantageously used elsewhere in the process i.e. fed to the gas generator or to the noncatalytic shift converter. A suitable methanation catalyst comprises $NiO$-$Al_2O_3$ precipitated on Kaolin and reduced with hydrogen. Preferably all steps in the process, including the methanation reaction, take place at substantially the same pressure as in the reaction zone of the synthesis-gas generator, less ordinary line drop. In other words, the generator pressure is maintained slightly above the desired delivery pressure of the methane product gas.

Methane-rich gas, such as produced by the subject invention, may be used as high-heating value fuel gas. Further, gas streams having a high concentration of methane, e.g., 90 mole percent or higher, are suitable for use in the organic synthesis of many chemicals. For example, methanol and formaldehyde are the principal products of the direct oxidation of methane. Using a high ratio of $CH_4$ to Cl, good yields of methyl chloride and methylene dichloride can be obtained at 400°C.

It is therefore a principal object of the invention to provide a continuous economical process for producing a gaseous stream comprising principally methane.

Another object is to provide a process for the production of large volumes of high heating value fuel gas.

A still further object is to manufacture a methane gas suitable for use in organic synthesis as petrochemical feedstocks.

Another object is to provide a process for the production of a methane-rich gas from a hydrocarbonaceous fuel wherein substantially all of the carbon in said fuel is converted into methane or utilized for its fuel value.

DESCRIPTION OF THE INVENTION

The present invention involves an improved continuous process for the production of a gaseous stream comprising about 45–99.0 mole percent of methane (dry basis).

Synthesis gas comprising principally hydrogen, carbon monoxide, carbon dioxide, water vapor, and methane, and containing small amounts of nitrogen argon, carbonyl sulfide, hydrogen sulfide, and entrained particulate carbon is produced by the reaction of a hydrocarbonaceous fuel by partial oxidation with an oxygen-rich gas and steam in the reaction zone of a free-flow synthesis gas generator free from packing or catalyst. The composition of the charge and the conditions of the reaction are controlled so as to produce preferably an effluent gas stream containing 10 to 26 volume percent of methane and from about 0.1 to 10 weight percent of entrained particulate carbon (basis weight of carbon in the hydrocarbonaceous fuel).

For example, the particulate carbon may be scrubbed from the effluent gas stream and recovered as a pumpable slurry comprising up to 15 wt. percent of particulate carbon in a liquid hydrocarbon fuel oil at a temperature in the range of about 150 to 800°F. This hydrocarbonaceous feedstock is mixed with or dispersed in steam at a temperature in the range of about 300 to 1,000°F. This mixture is then introduced into the reaction zone of a free-flow noncatalytic synthesis-gas generator by means of a burner. Suitably, an annulus-type burner, such as described in coassigned U.S. Pat. No. 2,928,460 issued to duBois Eastman et al., may be employed.

Simultaneously, nearly pure oxygen (95 mole percent $O_2$ or more) at a temperature in the range of about ambient to 1,000°F. is introduced into the reaction zone by means of said burner. The amount of oxygen is controlled so as to prvent complete oxidation of the hydrocarbon feed. Other oxygen-rich gases may be used, e.g., air and oxygen-enriched air (22 mole percent oxygen or more). However, nearly pure oxygen is preferred in order to avoid minor amounts of nitrogen and argon in the effluent gas. The atomic ratio of free (uncombined) oxygen to carbon in the feed (O/C ratio) is maintained in the range of about 0.60–1.2.

Oxygen is mixed with the hydrocarbonaceous feedstock and $H_2O$ in the reaction zone of the free-flow noncatalytic synthesis-gas generator; and the mixture is reacted at an autogenous temperature in the range of about 1,200 to 3,000°F. and preferably in the range of about 1,200°F. to 1,700°F. and at a pressure in the range of about 1 to 250 atmospheres, and preferably in the range of 15 to 250 atmospheres. The reaction time in the gas generator is about 1 to 8 seconds.

Hydrocarbonaceous fuels which are suitable feedstocks for our process include by definition various petroleum distillates and residua, naphtha, gas oil, residual fuel, reduced crude, whole crude, coal tar, coal oil, shale oil, and tar-sand oil. Included also are pumpable slurries of solid hydrocarbonaceous fuels e.g. coal, particulate carbon, and petroleum coke in water or in a liquid hydrocarbon fuel such as previously listed.

The $H_2O$ may be supplied to the generator in liquid or gaseous phase and in admixture with the oxygen-rich gas or the hydrocarbonaceous feedstock. Water will moderate the temperature in the reaction zone and may also react with CO and the hydrocarbon fuel in the reaction zone. From about 0.1 to 6 parts by weight of $H_2O$ are used per part by weight of hydrocarbonaceous fuel feedstock. Preferably, the $H_2O$ to fuel weight ratio is in the range of about 3 to 5 for maximum methane content in the effluent gas from the generator. For example, from about 10–26 volume percent methane on a dry basis and even higher e.g. 35 volume percent may be thereby produced.

As depicted in the drawing, the synthesis-gas generator is free from packing and other obstructions to the flow of the gases therethrough. It is a cylindrically shaped vertical steel pressure vessel whose inside walls are lined with refractory. An axially aligned flanged inlet port is located at the top of the vessel, and a flanged outlet port is located at the bottom. The various feedstreams may be introduced into the gas generator at ambient temperature, but preferably they are introduced at a temperature in the range of about 100°F. to 1,000°F. Preferably, an annulus-type burner which is axially mounted in the top flanged port of the generator may be used for introducing and mixing the feedstreams. When the amount of hydrogen in the process gas stream leaving the gas generator is insufficient to provide a favorable $H_2/CO$ mole ratio for the methanation reaction which takes place subsequently in the process, the amount of hydrogen in the process stream may be increased to provide a mole ratio $H_2/CO$ in the range of about 1.5 to 4, and preferably about 3. In our invention this is accomplished by the noncatalytic high temperature water-gas shift reaction as described below.

In a separate free-flow unpacked reaction chamber, about 0.1 to 2.5 moles of supplemental steam produced subsequently in the process at a temperature in the range of about 500 to 1,500°F., and preferably in the range of about 500 to 750°F., are mixed with each mole of dry effluent process gas from the synthesis-gas generator. The effluent gas is introduced into the noncatalytic thermal shift converter at substantially the same conditions of temperature and pressure as it is produced in the gas generator. Then by the noncatalytic adiabatic water-gas direct shift reaction, steam and CO from the effluent stream of synthesis-gas react at a temperature of at least 1,500°F. and preferably at a temperature in the range of 2,800 to 1,700°F. to produce additional $H_2$ and $CO_2$. By means of this reaction the $H_2/CO$ ratio may be adjusted to the desired ratio. No catalyst is necessary due to the high temperature of the reactants. Preferably, this high temperature thermal shift reaction takes place in the insulated line connecting the bottom flanged outlet of the synthesis-gas generator with the bottom flanged inlet of a waste heat boiler. Thus the effluent process gas is thermally shifted while in transit between process stages. Residence time is in the range of about 0.1 to 5 seconds.

After thermal shift, the process gas stream is introduced into a waste-heat boiler where it is cooled to a temperature in the range of about 400 to 800°F., by indirect heat exchange with water. The water in the waste heat boiler is converted to steam at a pressure which depends on the process pressure and outlet temperature. The steam may be superheated if desired. A portion of the steam can be used to drive a turbocompressor for the air separation unit. A second portion of said steam may be introduced into the aforesaid thermal shift converter as said supplemental steam. The compressed air is introduced into a conventional air separation unit which separates out nitrogen and other gaseous impurities and supplies substantially pure oxygen (for example 99.5 mole percent $O_2$) to the synthesis gas generator. An example of a typical air separation unit is described in Perry's Chemical Engineers' Handbook, Fourth Edition, McGraw-Hill 1963, Page 12–14, FIG. 12–30.

Particulate carbon and other solids entrained in the cooled effluent process gas, are next removed in a gas-liquid scrubbing zone. The particulate carbon is preferably removed by scrubbing the process gas stream with scrubbing oil. Preferably, the temperature of the scrubbing oil is kept below its cracking temperature and above the dewpoint of $H_2O$ in the process gas stream. In one embodiment of our process, the process gas stream is introduced into a liquid-gas tray-type column, such as more fully described in Perry's Chemical Engineers' Handbook, Fourth Edition, McGraw-Hill 1963, Pages 18-3 to 5 in countercurrent flow with a liquid hydrocarbon fuel oil. A slurry of particulate carbon and liquid hydrocarbon fuel oil is removed from the bottom of the scrubbing column at a suitable preheat temperature for introducing into the reaction zone of the synthesis gas generator as a major portion of the feedstock. When required, additional scrubbing may be provided to supplement the aforesaid gas scrubbing. For example, the gas stream may be quenched in hydrocarbon oil or washed with a liquid hydrocarbon fuel by means of a scrubbing nozzle or venturi scrubber, such as described in Perry's Chemical Engineers' Handbook, Fourth Edition, McGraw-Hill 1963, Pages 18-54 to 56. The process gas stream leaving from the top of the scrubbing tower substantially free from particulate carbon and at a temperature in the range of about 400 to 650°F. is then cooled to condense out and separate any volatilized hydrocarbons and water found therein.

$CO_2$, $H_2S$ and COS may be removed from the process gas stream in an acid-gas separation zone by a suitable conventional process involving refrigeration and physical or chemical absorption with solvents, such as n-methyl-pyrrolidone, triethanolamine, propylene carbonate, or alternately with hot potassium carbonate. Methane should be substantially insoluble in the solvent selected. Most of the $CO_2$ absorbed in the solvent can be released by simple flashing, the rest being removed by stripping. This may be done most economically with impure nitrogen that is available free of cost from the air-separation unit used to provide oxygen for the gasification step. The stream of $CO_2$ has a purity of more than 98.5 percent and may therefore be used for organic synthesis. The regenerated solvent is then recycled to the absorption column for reuse. When necessary, final cleanup may be accomplished by passing the process gas through iron oxide, zinc oxide, or activated carbon to remove residual traces of $H_2S$ or organic sulfide.

The substantially dry gaseous mixture from the acid-gas separation zone having the following composition in mole percent is then introduced into a methanation zone: $H_2$ 30 to 90, CO 10 to 30, $CH_4$ 1 to 40, $CO_2$ less than 1, and less than about 0.1 parts per million of total sulfur i.e. $H_2S$ + COS.

Similarly $H_2S$ and COS-containing solvent is regenerated by further flashing and stripping with nitrogen. The $H_2S$ and COS are then converted into sulfur by a suitable process; for example, the Claus process for producing elemental sulfur from $H_2S$ as described in Kirk-Othmer Encyclopedia of Chemical Technology, Second Edition Volume 19, John Whiley, 1969, Page 352.

The catalytic production of methane from carbon monoxide and carbon dioxide is highly exothermic. Unless the heat is successfully removed from the catalyst bed, high feed-gas throughputs can produce excessive catalyst-bed temperatures that can destroy the activity of the catalyst and reduce methane yields. Temperature control may be effected by any of the following techniques: distribution of the feed-gas stream throughout fixed or fluidized-bed reactors by means of separate inlet points, embedding tubular coolers in the catalyst beds and producing steam which may be used elsewhere in the process, cooling the effluent gas between beds, with simultaneous steam generation, or by using a free-flow tubular reactor whose inside surfaces are coated with catalyst.

Another method of controlling catalyst-bed temperatures while increasing the concentration of methane in the product gas consists of recycling a portion of the product gases through the catalyst bed at ratios ranging from 1-50 volumes of recycle gas per volume of fresh feed gas and preferably at recycle ratios in the range of 1 to 5.

The Group VIII transition elements, mainly iron, nickel, and cobalt, appear to be the most suitable for use as methanation catalysts. Typical commercial preparations contain about 33 to 78 weight percent of nickel oxide and about 12 to 25 percent of aluminum oxide and are used in the form of ⅝ × ⅝ or ¼ × ¼ cylindrical tablet. A typical nickel oxide catalyst is Girdler G65 produced by Chemetron Corp. Suitable catalyst compositions include the following: $NiO-Al_2O_3$ or $NiO-MgO$ precipitated on kaolin and reduced with hydrogen; and also in parts by weight Ni 100, $ThO_2$ 6, MgO 12, and Kieselguhr (diatomaceous earth) 400 reduced with hydrogen for 2 hours at 752°F. followed by heating for 100 hours at 932°F. The life of the catalyst may be extended by maintaining the sulfur level in the reactant gases below about 0.005 grains of sulfur per thousand standard cubic feet. Carbon deposition on the catalyst may be minimized by maintaining in the process feed gas a high mole ratio $H_2/CO$ in the range of 1.5 to 5 and preferably in the range of 2.5 to 5. Steam may be added to the reactant gas to decrease the amount of carbon that is deposited; however, in such instance there may be a decrease in methane yield. The operating temperature in the methanator is in the range of about 390 to 1,000°F. For example the preferable exit temperature for the aforesaid $NiO-Al_2O_3$ catalyst is about 662°F. Space velocities range from 100 to 10,000 standard volumes of gas per volume of catalyst ($hr^{-1}$) and pressures range from 1 to 250 atmospheres.

The effluent gas from the methanation catalytic reactor comprises from about 45 to 95 volume percent of methane or higher. However, by keeping the feedstock to the methanator dry and the molecular ratio $H_2/CO$ of about 3, substantially all of the CO and hydrogen in the feedstock are converted to methane and water, as shown by equation I.

$$CO + 3H_2 \rightarrow CH_4 + H_2O \qquad (I)$$

The water in the effluent gas stream is condensed out leaving substantially pure methane (99 volume percent). If required, cryogenic refrigeration may be used to separate the methane from nitrogen and argon which may be present in the amount of about 0.1 to 0.3 volume percent.

DESCRIPTION OF THE DRAWING AND EXAMPLE

A more complete understanding of the invention may be had by reference to the accompanying schematic drawing which shows the previously described process in detail. Although the drawing illustrates a preferred embodiment of the process of this invention, it is not intended to limit the continuous process illustrated to the particular apparatus or materials described. Quantities have been assigned to the various streams so that the description may also serve as an example.

On an hourly basis, with reference to the drawing about 376,660 pounds of hydrocarbonaceous feedstock at a temperature of about 750°F. from holding tank 1 are passed through lines 2 and 3 by means of pump 4 and mixed in line 5 with 1,482,940 lbs of steam from line 6 superheated to a temperature of 750°F. The mixture is passed into the annulus 7 of annulus burner 8 mounted in the upper flanged inlet 9 of free-flow non-catalytic partial oxidation synthesis gas generator 10 having a 600 cubic feet combustion chamber. The hydrocarbonaceous feed mixture in holding tank 1 is comprised of 244,210 lbs of fresh bunker fuel oil feed in line 11 having a gross heating value of 17,710 BTU/lb and 8.0°API, 118,550 lbs of a slurry from line 12 comprising 5,930 lbs. of particulate carbon and 112,620 lbs. of scrubbing oil, and 13,900 lbs of a 36.5°API light liquid hydrocarbon distillate from line 13. 388,350 lbs. of pure oxygen (95.6 mole percent $O_2$) in line 14 at a temperature of 300°F. are passed through center passage 15 of burner 8.

Advantageously, the oxygen is obtained by introducing air into turbocompressor 16 by way of line 17.

Steam from line 18 produced subsequently in the process may be used to drive said turbocompressor. The compressed air in line 19 is introduced into a conventional air-separation unit 20 from which nitrogen is removed by way of line 21 and pure oxygen by way of line 14. The nitrogen may be used subsequently in the process to separate unwanted gases from the process gas stream. The pure oxygen, $H_2O$ and hydrocarbonaceous feed are mixed in reaction zone 22 of synthesis gas generator 10 and reacted by partial oxidation at an autogenous reaction temperature of about 2,130°F. and a pressure of about 1,350 psig. The reaction reading time is about 3 seconds.

14,922,000 SCFH of effluent synthesis gas (dry basis) containing 1,338,000 lbs/hr of steam leave the gas generator by way of flanged bottom outlet 23, having the analysis shown in Table I. The effluent synthesis gas passes through free flow refractory lined connector 24 which is free from packing and catalyst and which joins flanged outlet 23 at the bottom of the gas generator with flanged inlet 25 at the bottom of waste heat boiler 26. 315,110 lbs of supplemental steam produced subsequently in the process at a temperature of 606°F. and superheated to 750°F. are introduced into unpacked free-flow connector 24 by way of line 27. By noncatalytic direct water-gas shift reaction, the supplemental steam reacts with CO in the process gas stream flowing through the connector to produce additional hydrogen. The reaction time is about one-half second. The mole ratio of $H_2/CO$ in the process gas stream is thereby preferably increased to about 3.

About 15,159,000 SCFH of shifted process gas stream (dry basis) containing 1,622,800 lbs of steam are cooled in waste heat boiler 26 from a temperature of 1,990°F. by indirect heat exchange with water. The water in turn is evaporated to form high-pressure steam. Cooling water enters waste-heat boiler 26 by way of line 28 and leaves by way of line 29 at a temperature of about 606°F. A portion of the steam in line 30 may be passed into connector 24 by way of line 27. Alternatively, this steam can be superheated, for example to 750°F. Similarly, a portion of superheated steam from waste heat boiler 26 may be passed through line 29 and 18, as previously described, to operate turbocompressor 16. Another portion of said superheated steam may be passed through line 6 and introduced into the gas generator in admixture with the fuel oil by way of line 5.

The cooled process gas stream leaves waste heat boiler 26 by way of upper flanged outlet 31 at a temperature of about 700°F., and is passed through connector 32 and flanged bottom inlet 33 of tray-type gas-liquid scrubbing column 34. The gases and vapors rising through scrubbing column 34 are countercurrently contacted with 139,030 lbs. of a 14.5°API liquid hydrocarbon fuel in line 35 having a gross heating value of about 17,500 BTU/lb. and a temperature of about 600°F. In this manner substantially all of the particulate carbon and solid matter in the process gas stream are scrubbed out and then removed from the bottom of scrubbing column 34 by way of line 36 at a preheated slurry at a temperature of about 650°F. comprising 125,130 lbs. of scrubbing oil and 6,590 lbs. of particulate carbon. As previously mentioned, this slurry may constitute a portion of the feed to the synthesis-gas generator. Optionally, a portion of this slurry i.e. 13,172 lbs. may be removed by way of lines 37-38 and valve 39 for use elsewhere as a fuel.

The clean process-gas stream leaving scrubbing column 34 overhead through line 40 at a temperature of about 695°F. is cooled in waste-heat boiler 41 to a temperature of about 450°F. For example steam is produced for use in the system from water entering boiler 41 by way of line 42 and leaving as about 200 psig steam by way of line 43. The process-gas stream is then passed through line 44 into cooler 45 where it is cooled to a temperature of 100°F., thereby condensing water and volatile hydrocarbons contained therein. The cooled process-gas stream is passed through line 46 and into a gas-liquid separator 47. The condensed liquids separate by gravity and 1,622,800 lbs of water are drawn off from bottom line 48. A 36.5°API light liquid hydrocarbon distillate is drawn off separator 47 by way of line 13 and may be used as a portion of the feed for synthesis-gas generator 9, as previously described.

The dry process gas leaving from line 49 at the top of separator 47 and having the analysis as shown in Table I is introduced into acid-gas separation zone 50. For example, by means of a conventional solvent process as previously described $CO_2$ and $H_2S$ may be scrubbed from the process-gas stream at substantially the same pressure as in the reaction zone of the synthesis-gas generator less ordinary line drop. About 613,960 lbs of $CO_2$ i.e. about 96.5 mole percent of the total $CO_2$ are removed from acid-gas separator 50 by way of line 51.

The remainder of the $CO_2$ and 19,310 lbs of $H_2S$ leave acid-gasiseparation unit unit 50 by way of line 52, and are introduced into a conventional Claus Unit 53. 17,260 lbs of sulfur are produced in Claus Unit 53 and are withdrawn by way of line 54.

About 9,521,000 SCFH of dry, $CO_2$-free process-gas stream leaving acid-gas separation unit 50 by way of line 55 at a temperature of 80°F. are preheated to a temperature in the range of about 500–650°F. in heater 56 by indirect heat exchange with the product gas leaving methanator 57 by way of line 58.

The preheated process gas stream is passed through line 59 and is mixed in line 60 with a recycle portion of the methane product gas stream from lines 61–62 and valve 63. For example, the partially cooled wet product gas stream leaving preheater 56 by way of line 64 at a temperature of about 550°F. is introduced into cooler 65 and cooled below the dew point e.g. 100°F. to condense out the water in the gas stream. The process gas stream is then passed into gas-liquid separator 66 by way of line 67. About 77,900 lbs of water are drawn off from the bottom of separator 66 by way of line 68. Methane product gas is removed from the top of separator 66 through line 69. A sufficient amount of the product gas is compressed by a compressor not shown in the drawing and recycled to methanator 57 in admixture with the process gas stream from line 59 as previously described so as to control the inlet temperature of the feed gas to methanator 57 at about 500°F. and the outlet temperature of the gases at about 850°F.

The process gas may be passed through one or more beds of a commercial heat resistant nickel oxide methanation catalyst at a suitable space velocity to achieve the desired reaction temperature and CO conversion, as previously mentioned. Since the methantion reaction is highly exothermic, the temperature in the reaction zone may be further controlled by passing the reacting gases in indirect heat exchange with water. The water is thereby vaporized and used elsewhere in the process. For example, methanator 57 may comprise a bank of tubes whose internal or external surfaces are coated with nickel oxide catalyst. Reaction between the $H_2$ and CO may take place as the process gas passes through or over the tubes in indirect heat exchange with water. Preferably, the pressure in the methanator as well as the rest of the system is substantially equal to the pressure in reaction zone 22 of the synthesis gas generator, less ordinary line drop. About 4,598,000 SCFH of dry methane product gas leave the system by way of line 70, valve 71, and line 72 having the analysis shown in Table I.

Optionally, when necessary a final purification of the methane product stream may be effected by conventional processes not shown. For example, copper-liquor washing may be used to remove any residual carbon-monoxide and hydrogen. Nitrogen and argon may be separated by conventional diffusion processes and cryogenic techniques. However, by operating the synthesis gas generator with 99.5 percent oxygen, essentially all of the nitrogen and argon may be eliminated from the product gas. Advantageously, by keeping the feed gas to the methanator dry and adjusting the mole ratio $H_2/CO$ to 3/1, substantially all of the $H_2$ and CO react to form $CH_4$. In such case, substantially no residual $H_2$ and CO are in the product gas.

TABLE I

| | Line No. (Mole % dry basis) | | | |
|---|---|---|---|---|
| | 23 | 49 | 55 | 72 |
| CO | 13.71 | 10.89 | 17.24 | 0 |
| $H_2$ | 30.97 | 32.68 | 52.28 | 1.20 |
| $CH_4$ | 18.10 | 17.65 | 28.09 | 93.85 |
| $CO_2$ | 34.23 | 35.85 | 0 | 0 |
| COS | 0.03 | 0.03 | 0 | 0 |
| $H_2S$ | 1.41 | 1.38 | 0 | 0 |
| A | 1.00 | 0.98 | 1.52 | 3.15 |
| N | 0.55 | 0.54 | 0.87 | 1.80 |

Obviously many modifications and variations of the invention as hereinbefore set forth may be made without departing from the spirit and scope thereof, and only such limitations should be imposed as are indicated in the appended claims.

We claim:
1. A process for producing a methane-rich gas stream comprising the steps of
   1. reacting a hydrocarbonaceous feedstock by partial oxidation with a free-oxygen containing gas and steam at an autogenous temperature in the range of about 1,200 to 3,500°F. and a pressure in the range of 1 to 250 atmospheres in the reaction zone of a free-flow unpacked noncatalytic synthesis-gas generator to produce an effluent gas mixture principally comprising $H_2$, CO, $CO_2$, $H_2O$ and $CH_4$ and containing minor amounts of COS, $H_2S$, A, $N_2$, and particulate carbon;
   2. mixing supplemental steam with the effluent gas mixture from 1 and reacting together $H_2O$ and CO in said mixture without a catalyst in a separate free-flow unpacked reaction chamber at a temperature in the range of about 2,800 to 1,500°F. thereby increasing the mole ratio $H_2/CO$ in the process gas stream;
   3. cooling the process gas stream from 2 and separating therefrom $CO_2$, $H_2O$, COS, $H_2S$ and particulate carbon;
   4. reacting $H_2$ and CO in the process gas stream from 3 while in contact with a methanation catalyst at a temperature in the range of about 390 to 1,000°F. and at a pressure in the range of about 1 to 250 atmospheres to produce said methane-rich gas stream.

2. The process of claim 1 where in step 1 about 0.1 to 6 pounds of steam at a temperature in the range of about 500 to 1,500°F. are continuously supplied to the reaction zone of said synthesis-gas generator for each pound of hydrocarbonaceous feedstock and where in step 2 about 0.1 to 2.5 moles of supplemental steam are introduced per mole of effluent gas mixture dry basis.

3. The process of claim 1 where said oxygen-rich gas is substantially pure oxygen, the steam to hydrocarbonaceous fuel in step 1 is in the ratio of about 3 to 5, the autogenous reaction temperature in the synthesis-gas generator is in the range of about 1,200 to 2,200°F., the methane content of the effluent gas mixture from step 1 is in the range of about 10 to 26 volume percent (dry basis), the $H_2/CO$ mole ratio of the process gas stream in step 4 is about 3, and said methane-rich gas stream comprises at least 90 mole percent methane.

4. The process of claim 1 wherein the methanation reaction in step 4 is effected by passing said process gas stream in indirect heat exchange with water by means of nickel oxide coated tubing.

5. The process of claim 1 wherein the methanation reaction in step 4 is effected by passing said process gas stream free from $H_2O$ and $CO_2$ and having a $H_2/CO$ ratio in the range of about 2.5–3.5 in contact with a catalyst comprising NiO-MgO precipitated on kaolin and reduced, at a temperature in the range of about 390 to 670°F., and at a space velocity in the range of about 100 to 10,000 standard volumes of gas per volume of catalyst ($hr^{-1}$).

6. The process of claim 1 wherein the pressure throughout the system is substantially the same as the pressure in the reaction zone of said free-flow synthesis-gas generator, less ordinary line drop.

7. The process of claim 1 wherein the separating in step 3 is effected by initially introducing the process gas stream from step 2 into a first scrubbing zone where the gas is intimately contacted with a scrubbing oil, producing a slurry of particulate carbon and scrubbing oil and separating this slurry from the particulate carbon-free process-gas stream, and then subsequently cooling and condensing out any $H_2O$ and volatile hydrocarbons in said particulate-carbon-free process gas stream before introducing said gas stream into a second separation zone where the acid-gas constituents of said process-gas stream are removed in a physical-solvent absorption system.

8. The process of claim 1 wherein the methanation catalyst in step 4 comprises about 33 to 78 weight percent of nickel oxide and 12 to 25 weight percent of aluminium oxide.

9. The process of claim 1 wherein said free-oxygen containing gas is selected from the group consisting of air, oxygen-enriched air (22 mole percent oxygen or more), and substantially pure oxygen (95 mole percent $O_2$ or more).

10. The process of claim 1 wherein said hydrocarbonaceous feedstock is selected from the group consisting of petroleum distillates and residua, naphtha, gas oil, residual fuel, reduced crude, whole crude, coal tar, coal oil, shale oil, tar-sand oil, and pumpable slurries of coal, particulate carbon, and petroleum coke in water or in a hydrocarbon fuel.

11. A process for producing a gaseous stream comprising about 45 to 90 mole percent of methane or higher comprising the steps of 1. reacting a hydrocarbonaceous fuel by partial oxidation with oxygen and steam in the amount of 3 to 5 parts by weight steam per part by weight of hydrocarbonaceous fuel at an autogenous temperature in the range of about 1,200 to 2,200°F. and a pressure in the range of 1 to 250 atmospheres in the reaction zone of a free-flow unpacked non-catalytic synthesis-gas generator to produce an effluent gas mixture substantially comprising $H_2$, CO, $CO_2$, $H_2O$, $CH_4$ and particulate carbon and where said $CH_4$ is present in the range of about 10 to 35 volume percent (dry basis), and said particulate carbon is present in the amount of about 0.1 to 10 weight percent (basis weight of hydrocarbonaceous fuel).

2. mixing in a separate free-flow noncatalytic water-gas shift conversion zone supplemental steam produced subsequently in the process with the effluent gas mixture from 1 and reacting together $H_2O$ and CO in said mixture at a temperature in the range of about 2,800 to 1,500°F. until the $H_2$ and CO in the process gas stream is present in a mole ratio $H_2/CO$ in the range of about 1.5 to 4;

3. cooling the process gas stream from 2 to a temperature in the range of about 400 to 800°F. by indirect heat exchange with water thereby producing steam for use in 2;

4. scrubbing particulate carbon from the process gas stream from 3 in a gas-liquid scrubbing zone;

5. cooling the process gas stream from 4 to condense out and separate any $H_2O$ and volatile hydrocarbons;

6. separating any $CO_2$, COS, and $H_2S$ from the process-gas stream from 5 in an acid-gas-separation zone; and 7. reacting $H_2$ and CO in the process-gas stream from 6 while in contact with a methanation catalyst at a temperature in the range of about 390° to 1,000°F. and at a pressure in the range of about 1 to 250 atmospheres to produce said gaseous stream of methane.

12. The process of claim 11 wherein the catalyst in step 7 comprises in parts by weight Ni 100, $ThO_2$ 6, MgO 12, and Kieselguhr 400.

* * * * *